INVENTOR.
GERHARD HERR
GERT MAHLER

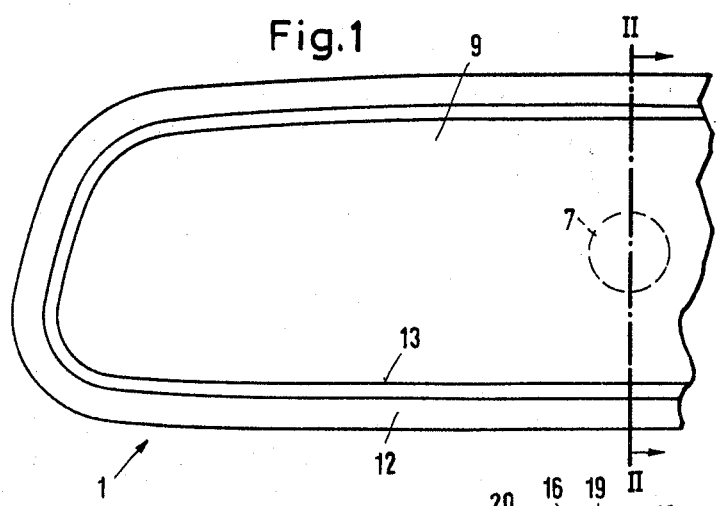
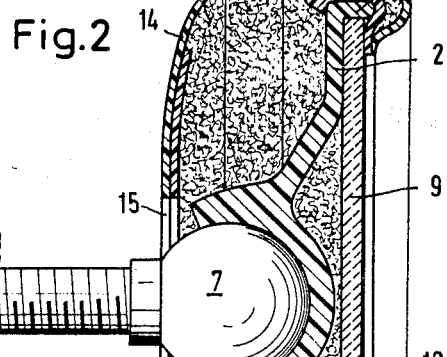
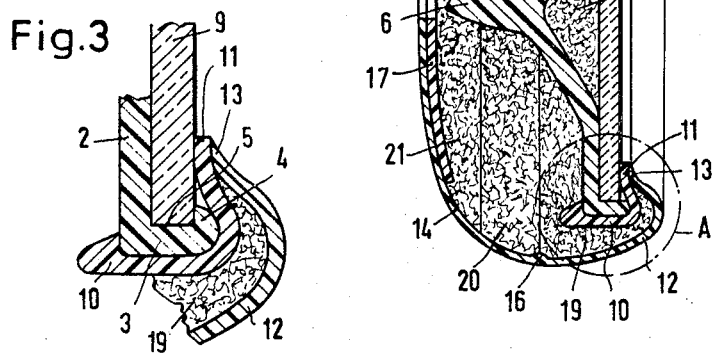

BY

ATTORNEYS

3,448,553
UPHOLSTERED MIRROR, PROCESS OF MANU-
FACTURING SAID MIRROR AND APPARA-
TUS FOR CARRYING OUT THE PROCESS
Gerhard Herr, Wuppertal-Vohwinkel, and Gert Mahler,
Radevormwald, Germany, assignors to Gebr. Happich
GmbH., Wuppertal-Elberfeld, Germany
Filed July 28, 1966, Ser. No. 568,537
Claims priority, application Germany, Nov. 9, 1965,
H 53,660; Feb. 9, 1966, H 58,483, H 54,562
Int. Cl. B60r 1/04; E04b 1/62; A47g 1/24
U.S. Cl. 52—400    11 Claims

ABSTRACT OF THE DISCLOSURE

A rear view mirror assembly adapted for mounting in the interior of a motor vehicle, wherein the mirror is surrounded by resilient padding, said padding protruding forward of the optical surface of the mirror in the region of the edges thereof.

---

This invention relates to an internal rear view mirror, particularly for vehicles.

The internal rear view mirrors which have previously been disclosed for motor vehicles and which must necessarily be mounted in front of the drivers and the passengers involve a danger of injury to the occupants of the vehicle in the case of an accident because such mirrors have a hard frame, which is provided with sharp edges in many cases.

It is an object of the invention to provide an internal rear view mirror which affords considerable protection from injury when the driver or a passenger is thrown against the mirror in the case of an accident.

According to the invention, this object is accomplished in that the internal rear view mirror is surrounded on all sides by a cushioning pad, which is apertured only in the area of the specular reflecting surface of the mirror. More particularly, the mirror according to the invention is characterized in that the cushioning pad extends in the rear of the mirror and embraces the edge of the mirror pane on the sides and in front. As a result, the mirror pane is set back as in a niche with respect to the forwardly protruding pad so that even a person frontally thrown against the mirror will contact the cushioning frame of the mirror rather than the hard mirror pane.

The invention utilizes advantageously a resilient frame of synthetic resin material, which frame embraces with snap action the edge of the mirror pane and components of its mounting and is heat-sealed to the inside edge of a frame-shaped punched element of soft plastic sheeting. When the mounting frame has a backing surface which contacts the mirror pane, and a rim which is not undercut and extends at right angles from said backing surface, this resilient frame serves as a retainer for the mirror pane. The frame of synthetic resin material has also the advantage that it can be heat-sealed and can be joined by heat-sealing to a plastic sheeting before the frame is snapped onto the edge of the mounting frame. This enables a simple joining of plastic sheeting to the mounting frame of a mirror, even when the mounting a frame-shaped punched element of soft plastic sheeting.

According to another feature of the invention, the frame-shaped punched element is welded at its outer edge to the outer edge of another punched element of plastic sheeting, this other punched element faces the rear of the mirror pane and of its mounting, and a cushioning pad is interposed between the rear of the mirror pane and its mounting, on the one hand, and said other punched element of plastic sheeting. This arrangement results in a smooth covering of the mirror without wrinkles and in a very simple manufacture. The two pieces of plastic sheeting which cover the mirror may be permanently dyed through in a plastic state in any desired color without disadvantage so that the mirror is color-coordinated with the remaining interior decoration of a vehicle.

In another embodiment of the invention, an advantageous feature resides in that the rim of the mounting frame which is contacted by the rear face of the mirror pane forms an undercut groove. This facilitates the assembling of the mirror because the mirror pane can be snapped into the undercut groove before the resilient frame is snapped on the mounting frame and the mirror pane cannot fall out of the mounting frame when the mirror is moved during the further assembling.

According to a particularly advantageous feature of the invention, the cushioning pad consists of a plurality of superimposed foam slabs. Such foam slabs are commercially available as semi-finished products in various thicknesses and need only be cut to the desired configuration and size. In this case it is not necessary to provide a special tool, which would substantially increase the costs of manufacturing the mirror. Such tool would be required for the manufacture of a cushioning pad in one piece. The cushioning of the edge adjacent to the resilient frame is facilitated by the pliancy of the relatively thin foam slab which contacts the mounting frame.

According to a further desirable feature of the invention, the foam slab which is adjacent to the mounting frame embraces the edge of the mirror pane and the mounting frame thereof on the sides and in front. This cushioning of the edge reduces the danger of injury by the edge, which is otherwise particularly dangerous.

If the mirror according to the invention is to be manufactured in such a quantity that the tool costs per mirror are very small, an integral foam pad may be used instead of a plurality of foam slabs. In this case, it is particularly advantageous if, in a further embodiment of the invention, the mirror pane and its mounting are joined by a foam member, which is foamed and cured in a mold around these parts.

The foam is preferably resilient and consists of rubber or synthetic resin material. The mirror is particularly characterized according to the invention in that the integral, cured foam member bears on one side against the mounting and on the other side against a marginal portion of the mirror pane. This results in the advantage that special fastening means, such as a retaining frame, are not required for a connection between the mirror pane and its support. In the resulting arrangement, the mirror pane is set back as in a niche from the forwardly protruding pad so that in the case of an accident even a person which is frontally thrown against the mirror will contact the cushioning pad thereof rather than the hard mirror pane.

It will be particularly desirable if, according to the invention, the cured foam member has a closed, abrasion-resisting outside surface, which is formed by the material of the foamed member itself. This eliminates the need for manufacturing and applying a separate covering. The skin which forms during the foaming and curing of the foamable liquid is distinguished by a high abrasive strength. Being made from foam which has been dyed through, it has the same color as the cured foam so that there will be no change in color when the skin is slightly abraded.

For the manufacture of the mirror according to the invention, a method is proposed in which the mirror pane and its mounting are initially placed into a foaming mold and the mold cavity is then partly filled with a foamable liquid, which consists particularly of rubber or synthetic resin material. This process is particularly advantageous in that it is not necessary to punch individual foam slabs and sheet coverings therefor. Such punching operation is time-consuming and results in trimmings, which are useless for the manufacture of the mirror and must be removed from the manufacturing station. Besides, there is no need for heat-sealing the cover sheets, which is difficult and requires great care.

The process according to the invention is advantageously carried out by an apparatus which is characterized by a resilient cushion, which bears on one side on the mold wall and on the other side on the mirror pane in a stressed state. In an unstressed state, this cushion slightly protrudes over that surface of the mold base which is to contact the mirror pane so that the mirror pane will first contact the cushion when the mirror pane is being placed onto the mold base. The pressure by which the two mold parts are closed will then cause the resilient cushion to be compressed until the margin of the mirror pane bears on the mold base. This arrangement prevents a breaking of the mirror pane, which consists in most cases of glass, when it is being placed into the mold or when the mold is being closed. Besides, the mirror pane is held in position between the mounting frame on its rear and the cushion in such a manner that the mirror pane cannot shift in the mold.

To compensate for thickness tolerances of the mirror pane, a clearance may be left between a rim portion of the mold and the mirror, or a resilient interlayer may be inserted between the mold top and the rear face of the mirror.

In vehicles to be subjected to particularly strong shakes, the strength of the joint between the mirror pane and its mounting frame is increased by the provision of an undercut groove, into which the mirror pane is snapped.

Illustrative embodiments of the invention are shown in the drawings, in which

FIG. 1 is a fragmentary front elevation showing in natural size an internal rear view mirror which is mounted by a ball-and-socket joint, FIG. 2 is an enlarged sectional view taken on line II—II if FIG. 1, and FIG. 3 shows on a still larger scale a modification of the detail A in FIG. 2. According to the modification, the mounting frame has an undercut groove, which embraces the edge of the mirror frame.

FIG. 4 is an enlarged sectional view taken on line II—II of FIG. 1,

FIG. 5 a further enlarged view showing the detail AB of FIG. 4, and

Figure 4:
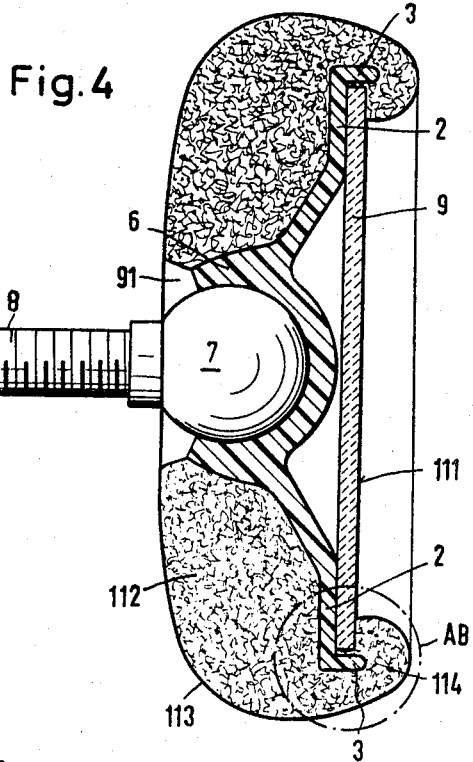

The internal rear view mirror 1 has a mounting frame 2, which consists of an elastic material preferably of plastics material and which forms a spherical socket 6 on its mounting side. A ball head 7 is held with breaking friction in the spherical socket 6 and is provided with an externally threaded stem 8, which is connected to a mounting arm, not shown. This mounting arm may be movable relative to the body of the vehicle.

According to FIG. 2, the mounting frame 2 has a rim 3, which is integral with an extends at right angles from the backing surface for the mirror pane 9. This rim forms a lateral stop for the mirror pane 9 and extends beyond the same. The resilient frame 10 consists of heat-sealable plastics material and is snapped onto the mounting frame 2 from in front to embrace the protruding portion of the rim 3. When snapped in position, the frame 10 urges the mirror pane 9 against the backing surface of the mounting frame 2 and prevents a falling of the mirror pane out of the mounting frame. The resilient frame 10 covers only a small marginal area of the front face of the mirror pane so that the remaining surface can be utilized as a specular reflecting face.

According to FIG. 3, the rim of the mounting frame 2 has an extension 4, which is parallel to the backing surface for the mirror and defines an undercut groove 5, into which the edge of the mirror pane 9 is snapped.

A covering of soft plastics material extends from the front portion of the resilient frame 10 to the area which surrounds the ball head 7 and its stem 8. This covering comprises a frame-shaped punched element 12 and a sheeting portion 14, which extends from said punched element 12 and on the rear of the mirror. The sheeting portion 14 has an aperture 15, which permits of a pivotal movement of the ball head 7 and the stem 8. Adjacent to the aperture 15, an annular sheeting element 17 is joined to the inside of the sheeting portion 14 as a reinforcement. The covering is stretched around a cushioning pad, which consists of the foam slabs 19, 20 and 21 and which covers the rear side of the mounting frame 2 and the resilient frame 10, which is snapped onto said mounting frame. A foam slab 18 is arranged between the mounting frame 2 and the rear face of the mirror pane 9.

The frame-shaped punched element 12 is heat-sealed at its edge 13 to the inside peripheral edge 11 of the resilient frame 10 before the latter is snapped onto the mounting frame 2. When the resilient frame 10 has been snapped onto the rim 3 of the mounting frame 2, the foam slabs 19, 20 and 21 and the heat-sealable sheeting 14 are applied. Thereafter the edge of the frame-shaped punched element 12 is welded to the sheeting 14 to form an internally directed seam weld 16. In this manner a covering is formed which is stretched without wrinkles about the foam slabs 19, 20 and 21.

Figure 5:
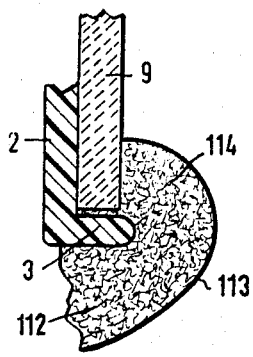

The mounting frame 2 of the rear view mirror 1 shown in FIG. 5 has an integral rim 3, which extends from the backing surface for the mirror pane 9. This rim forms a lateral stop for the mirror pane 9 and is embraced by the edge bead 114 of the integral foam body 112.

Figure 6:
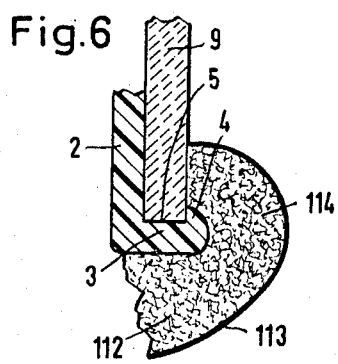
FIG. 6 shows a modification of the detail AB of FIG. 4. The mounting frame has in this case an undercut groove, which embraces the edge of the mirror pane.
Figure 7:
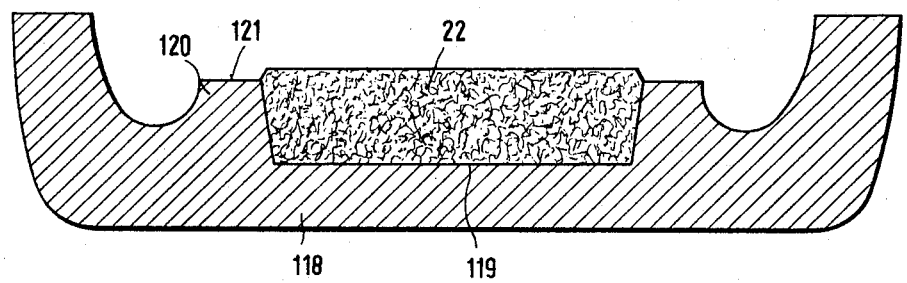
FIG. 7 shows a case part of a foaming mold and a resilient cushion inserted therein.

According to FIG. 6, the rim of the mounting frame 2 has an extension 4, which is parallel to the backing surface for the mirror and defines an undercut groove 5, into which the edge of the mirror pane 9 may be snapped.

An intergal foam body 112 covers the rear face of the mounting frame 2 and has an edge bead 114, which embraces the rim 3 of the mounting frame 2 and the marginal area of the specular face 111. An aperture 91 is formed in the rear portion of the foam body 112 and permits of a pivotal movement of the ball head 7 and of the stem 8.

For the provision of the foam body 112 on the mirror a mold is used which comprises a mold top 15 and a mold base 118. This mold may consist of metal or hard plastics material. The mold base 118 has a tub-like recess 119, in which a resilient cushion 22 is inserted, which consists, e.g., of foamed plastics material or foamed rubber. In unloaded condition, this cushion protrudes slightly above the top face 121 of the wall 120, which surrounds the recess 119.

The mirror parts which are not yet cushioned are placed into the mold in the following manner: The mirror pane 9 is first placed on the cushion 22, which is disposed in the mold base 118. In this phase, the mirror pane 9 is in contact only in its middle portion with the cushion 22 whereas the margin of the mirror pane 9 extends beyond the cushion and is free of contact. The mounting frame 2 connected to the ball head 7 and the stem 8 is then placed onto the rear face of the mirror pane 9, and the mold top 15 is placed on the mold base 118. The annular rib 116 of the mold top 15 rests on the spherical socket 6 of the mounting frame 2. The stem extends through the hole 117. The pressure which is applied to close the mold causes the mounting frame 2, which is interposed between the mold top 15 and the mirror pane 9, to force the latter against the cushion 22, which is now resiliently compressed to compensate for any thickness tolerance of the mirror pane 9. The mirror pane 9 is thus moved every close to the top face 121 but does not contact the same. The mirror pane 9 is now held in position between the mounting frame 2 and the pad 22, which exerts a resilient back pressure on the pane 9. In this way, a movement of the pane 9 relative to the mold is prevented. The tolerance of the mirror pane 9 may alternatively be compensated by a resilient interlayer between the mold top 15 and the mounting frame 2.

Figure 8:
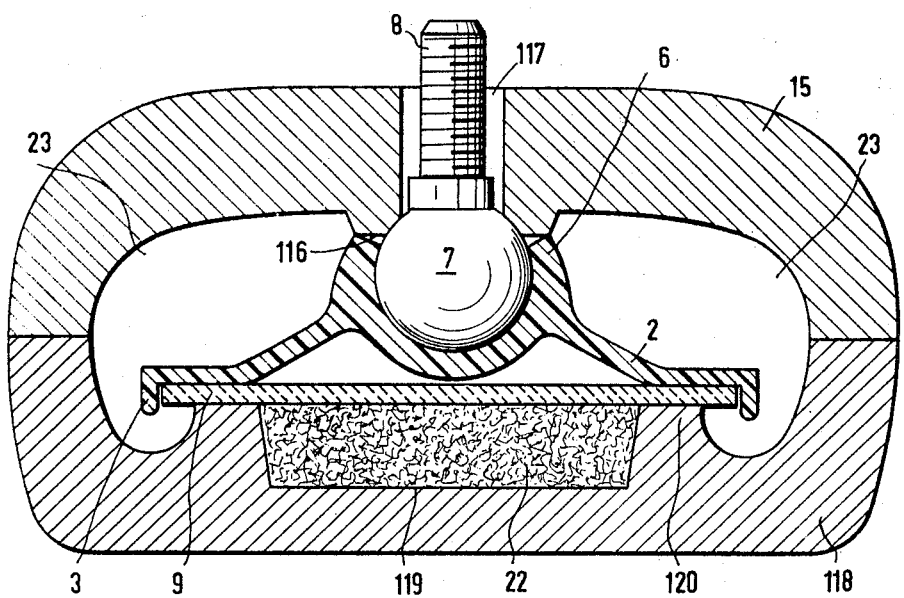
FIG. 8 shows the two mold parts assembled to form a mold, in which the mirror pane and its mounting have been inserted, before the filling of the mold cavity with foam.

A metered amount of foamable liquid is charged through an opening, not shown, into the cavity 23 which is enclosed by the two mold parts 15 and 118 (FIG. 8). This foamable liquid is foamed to completely fill the cavity 23. The foam is then cured to form the foam body 112, which is shown in FIG. 4 and cushions the mirror components. The foam body 112 resiliently grips the edge portions of the mounting frame 2 and of the mirror pane 9 with sufficient force to hold the mirror pane 9 to the mounting frame 2 even under the action of shakes so that the pane cannot fall from its mounting frame. The curing of the liquid foam results spontaneously in the formation of an abrasion-resisting skin 113 on the outside surface of the foam body 112.

In the case of relatively large mirrors, the foam may form additional shock-absorbing ribs which extend over the mirror face 111.

What is claimed is:

1. A rear view mirror assembly for mounting within a motor vehicle, comprising:
   a reflecting pane, a mounting frame surrounding the lateral edges of said reflecting pane and adapted for mounting to a fixed part of a motor vehicle and resilient pad means surrounding said reflecting pane at the rear, at its lateral edges and in the region of the edges of the optical surface thereof, said resilient means extending forward of the optical surface.

2. A rear view mirror assembly according to claim 1, further comprising resilient frame means engaging with said mounting frame in the region of the lateral edges of said reflecting pane and contacting the optical surface of said reflecting pane in the region of the edges thereof, said resilient frame means, in cooperation with said mounting frame, serving to securely retain said reflecting pane.

3. A rear view mirror assembly according to claim 2, further comprising shaped covering means in the form of elastic sheet material said covering means being heat-sealed at its inside edge to said resilient frame means, said resilient pad means being disposed within the space defined by said covering means and said resilient frame means.

4. A rear view mirror assembly according to claim 3, further comprising second shaped covering means in the form of elastic sheet material, said second covering means surrounding said mounting frame to the rear of said reflecting pane and being welded at one end thereof to the free end of said first covering means, thus defining a space behind said reflecting pane, said resilient pad means being disposed within said space thus defined.

5. A rear view mirror assembly according to claim 1, wherein said mounting frame includes an additional leg portion extending over the edge portion of the optical surface of said reflecting pane, said mounting frame thus defining a groove for form-lockingly retaining said reflecting pane, said mounting frame being constructed of an elastic material, thus permitting a snap-lock insertion of said reflecting pane therewithin.

6. A rear view mirror assembly according to claim 1, wherein said resilient pad means includes a plurality of superimposed slabs of foam material.

7. A rear view mirror assembly according to claim 6, wherein said resilient pad means is molded to engage with the optical surface of said reflecting pane in the region of the edges thereof, thus cooperating with said mounting frame to securely retain and reflecting pane.

8. A rear view mirror assembly according to claim 7, wherein said resilient pad means is a foam material molded and cured to secure said reflecting pane within said mounting frame.

9. A rear view mirror assembly according to claim 8, wherein said molded resilient pad means includes a closed, abrasion-resistant skin surface formed by the curing of the foam material.

10. A method of producing an internal rear view mirror, particularly for vehicles, which comprises a mirror pane, a mounting, and foam which holds the pane and mounting together, said foam forming a cushioning pad, which surrounds the mirror on all sides and leaves free only the specular reflecting face, characterized in that the mirror pane and its mounting are placed into a foaming mold and the mold cavity is then partly filled with a formable liquid, particularly of rubber or plastic.

11. Apparatus for use in a method of producing a mirror which comprises a mirror pane, a mounting, and foam which holds the pane and molding together, said foam forming a cushioning pad, which surrounds the mirror on all sides and leaves free only the specular reflecting face, in which process the mirror pane and its mounting are placed into a foaming mold and the mold cavity is then partly filled with a foamable liquid, particularly of rubber or plastic, characterized by a resilient cushion, which bears on one side against the mold wall and on the other side against the mirror pane and is held under stress thereby.

References Cited

UNITED STATES PATENTS

| | | | |
|---|---|---|---|
| 2,202,697 | 5/1940 | La Hodny | 52—400 |
| 2,968,995 | 1/1961 | Holden | 248—481 |
| 3,247,550 | 4/1966 | Haines | 18—36 |
| 3,291,435 | 12/1966 | Herr | 248—481 |

FOREIGN PATENTS 1,240,031  7/1960  France.

REINALDO P. MACHADO, *Primary Examiner.*

U.S. Cl. X.R.

248—481; 350—288